May 6, 1952 R. R. QUILLEN 2,595,812
CLOD CRUSHER

Filed March 14, 1950 2 SHEETS—SHEET 1

INVENTOR.
Rutherford R. Quillen
BY
Wood, Arey, Herron & Evans
ATTORNEYS

May 6, 1952 R. R. QUILLEN 2,595,812
CLOD CRUSHER
Filed March 14, 1950 2 SHEETS—SHEET 2
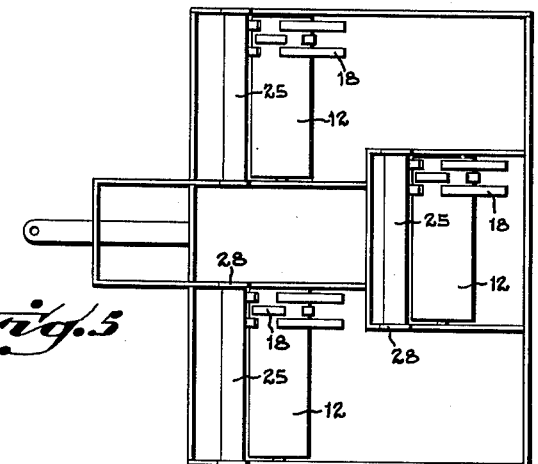
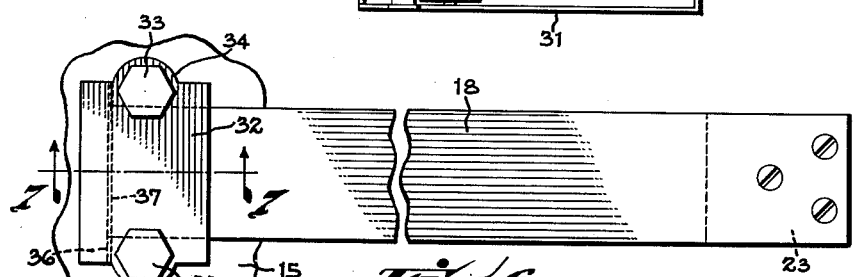
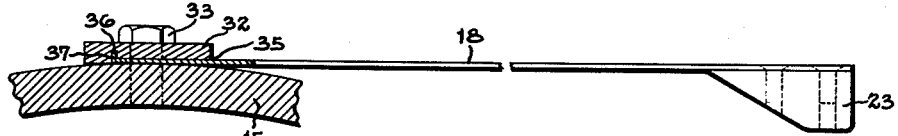
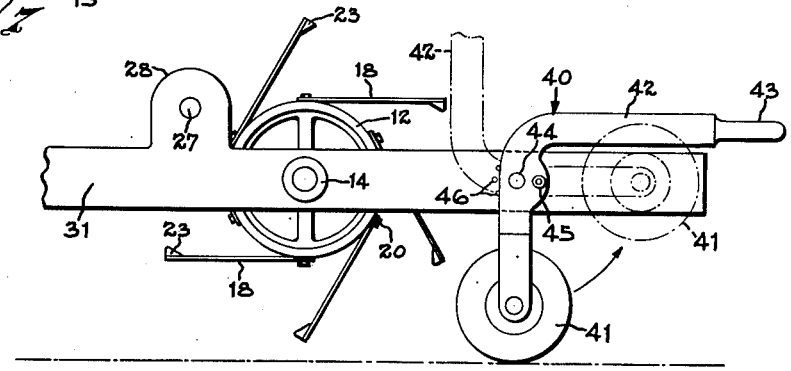
INVENTOR.
Rutherford R. Quillen
BY
Wood, Ary, Herron & Evans
ATTORNEYS Patented May 6, 1952

2,595,812

UNITED STATES PATENT OFFICE 2,595,812

CLOD CRUSHER

Rutherford R. Quillen, Cincinnati, Ohio

Application March 14, 1950, Serial No. 149,601

6 Claims. (Cl. 55—1)

This invention relates in general to earth working equipment, and is directed in particular to an improved clod breaking implement which is designed primarily to be utilized on plowed ground in order to break up the surface soil into fine particles.

One of the primary objects of the invention is to provide a clod breaking implement which is adapted to operate at maximum soil working efficiency whether it is moving over the ground slowly or rapidly. In the past, machines for breaking clods and packing the soil have been proposed which utilize tamping arms, geared or otherwise connected by linkage to the wheels of the machine so that the tamping force is directly proportionate to the speed at which the machines move over the ground. It also has been suggested that lengths of chains be utilized; each chain being secured at one end to a revolving shaft or arm, leaving the free end to swing by centrifugal force, thus flailing the ground as the machine moves along. The action of the chain type machine is even more dependent upon the speed at which it travels, and unless it is moving at a rather fast rate the chains are completely ineffective.

Another difficulty with the tamping or chain machines is that it is impractical to manufacture them in sizes small enough to be utilized as hand tools. In the first place, the mechanism involved is rather complicated and consequently, expensive; secondly, it is necessary to move the tools over the ground at a greater rate of speed than one is able to walk conveniently unless the mechanism is geared up, in which case the machine is difficult to move by hand.

Thus, it is another object of the invention to provide a clod breaking implement which in one embodiment is adapted to be utilized as a hand tool for working small garden plots. For this purpose the tool may be made rather light in weight and provided in a size which is easily handled and stored conveniently.

In the preferred embodiment of the invention, a plurality of spring metal strips are secured at one end to a cylindrical member so that the strips extend tangentially from its surface, the cylindrical member being adapted to be rolled over the ground. Means is provided for flexing the strips back toward the surface of the cylindrical member as the member is rolled, the means releasing the strips at a point where they slap down onto the surface of the soil, each strip straightening out tangentially at a time when it is parallel with the surface of the ground. The means which bends the strips back against the surface of the cylindrical member acts as a cocking mechanism, and whether the member is being rolled rapidly or slowly makes little difference in the force with which the strips strike the ground. This force is dependent almost wholly on the springiness of the metal. In the preferred embodiment, the cocking means comprises a rubber-covered roller which is mounted parallel with the cylindrical member and spaced slightly therefrom, so that as the implement is rolled over the ground, the strips, in turn, are brought into position against the cocking roller, bent back and then, after passing the roller, released to slap down onto the ground to break up the surface soil.

The implements made in accordance with the present disclosure, however, are not limited to hand tool sizes. One of the outstanding features of the invention is that the principle of operation is adapted to implements of any size. For example, the implements may be made in a size which is suitable for tractor operation only, or the implements may be grouped in gangs, in V or echelon formation, in order to provide a wide coverage on each pass over the ground. Of course, the implement may be made in different lengths; but in addition, there are other variables which add considerably to the adaptability to the present implements to soils of different types and to uses other than earth working. For instance, the cylindrical member which carries the spring metal strips may be provided in different weights and diameters. Also, spring metal strips of different degrees of flexibility may be utilized. Thus, a light cylindrical member may be utilized with strong spring metal strips in instances where it is desired to break up clods or other surface irregularities without packing the soil to any great extent. On the other hand, the cylindrical member may be made rather heavy, and light spring metal strips utilized where packing, in addition to clod breaking, is desired. In another embodiment, the implement may be used on golf greens and the like, where it is desired to shake fertilizer down to the roots of grass. In this instance, the cylindrical member may be made out of thin metal and very light spring metal strips utilized.

Other objects of the invention and advantages of the implements disclosed here will be readily apparent from the detailed description of the drawings in which:

Figure 5 is a top plan view showing three implements mounted in V formation in a frame adapted to be pulled by a tractor.

Figure 6 is a top plan view of one of the spring elements showing a modified form of the fastening means.

Figure 7 is a cross sectional view taken on the line 7—7 of Figure 6.

Figure 8 is a side elevational view showing an implement which is designed to be elevated off the ground by means of an auxiliary wheel which may be used when moving the implement over hard surfaces such as roads and the like.

Figure 1:
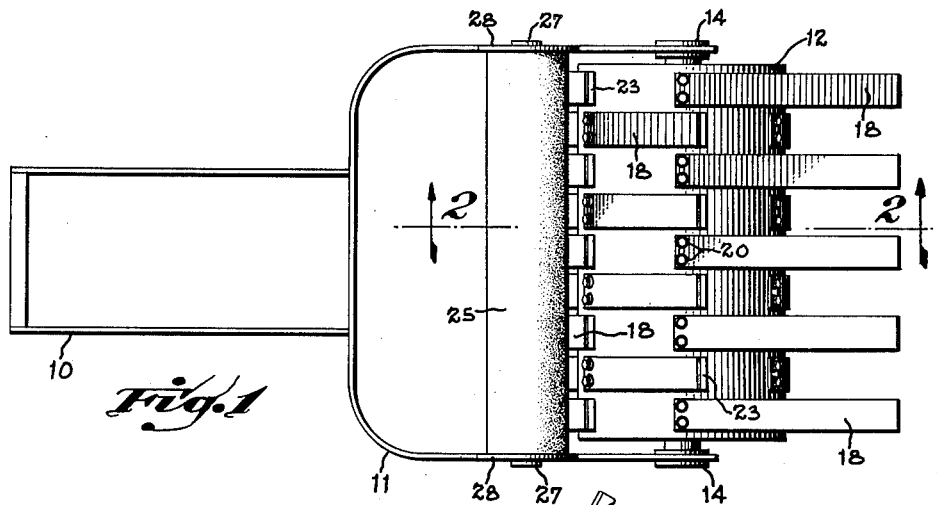
Figure 1 is a top plan view of a manually operated clod breaking implement made in accordance with the present invention.
Figure 2:
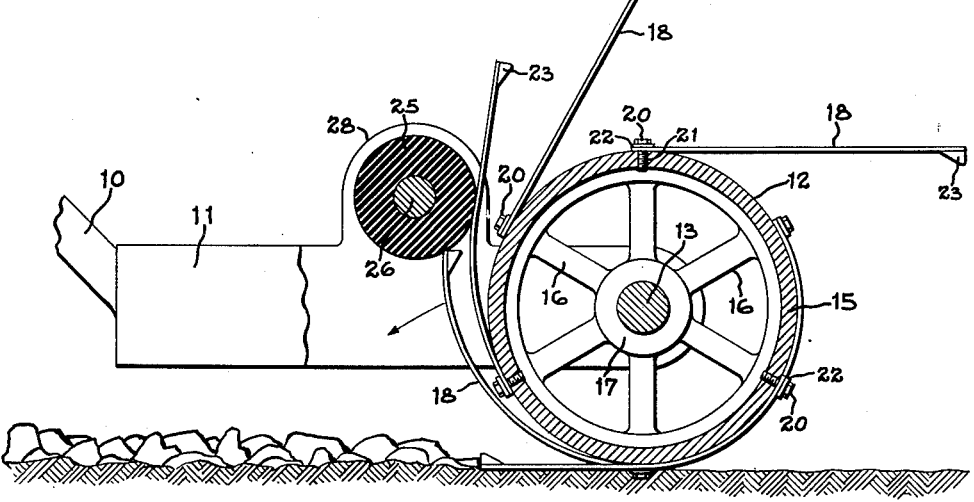
Figure 2 is a cross sectional view taken on the line 2—2 of Figure 1.
Figure 3:
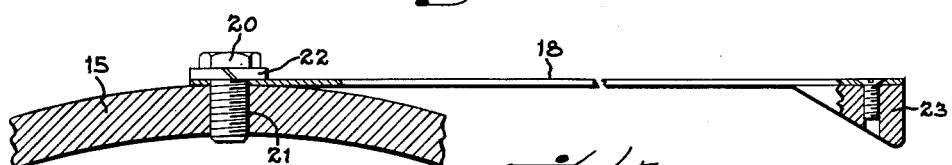
Figure 3 is an enlarged cross sectional view which illustrates a method of securing the spring members to the cylindrical member.

Figures 1 through 3 disclose the invention embodied in an implement which may be pulled by hand. In this instance, a handle structure 10 is provided, the handle being secured to a frame 11 in which a cylindrical member 12 is rotatably mounted. The cylindrical member 12 is carried on an axle 13 which is journalled at its respective ends in bearings 14—14 in the two sides of the frame 11. The member 12 includes a tubular outer portion 15 which is secured to a pair of spiders 16 having hub portions 17 journalled on the axle 13. The tubular portion 15 may be made heavy or light, as desired, depending on the use to which the implement is to be put. Also, the cylindrical member may be formed as a solid unit, or, if desired, made on the order of water-filled lawn rollers.

A plurality of spring metal strips 18 are secured to the surface of the cylindrical member. These strips preferably extend tangentially from this member. In the instance shown, the strips are secured to the cylinder by pairs of bolts 20 which extend through holes at the inner ends of the strips and are threaded into the cylindrical member as at 21 with lock washers 22 being provided for security. The outer or free ends of the strips may be weighted as shown at 23, the weight being secured to the strips by flat-headed bolts or other means known in the art. It is preferred, that the weights are located on the inner faces of the strips.

The pattern defined by the points at which the strips are affixed to the surface of the cylindrical member may be varied from that in the drawings. In the instance shown, three strips are provided in each circumferential row, these being spaced apart 120°, with alternate rows being offset 60°, so that the pattern is a staggered one. The particular pattern shown provides adequate coverage for most uses. However, it is obvious that more than three strips can be placed in each row, and that the rows may be staggered relative to each other in a pattern different from the one disclosed. It also will be noted that each strip is approximately ⅓ as long as the circumference of the cylindrical member. Thus, in any row the secured end of each strip is adjacent the free end of the strip next removed from it in the counter-clockwise direction shown, when the strip next removed is bent beneath the weight of the cylindrical member.

When three spring metal strips are utilized, the means for cocking and releasing the strips, as they are brought around into engagement with it, is located in front of the cylindrical member and above the ground at a point where release of the strip by the cocking means occurs when the secured end of the strip is on the ground. The preferred cocking means comprises a rubber roller 25 which is mounted on a shaft 26 extending between two bearings 27—27 located in the sides of the frame. Preferably, the axis of the shaft 26 is parallel with the axis of axle 13. The frame 11 may be made in various shapes and sizes, the one shown in the drawings being a diagrammatic representation only. In the frame shown, a pair of vertical flanges 28—28 are provided to support the bearings 27—27.

In the embodiment shown in Figure 2 of the drawings, the roller 25 serves to both cock and release the spring elements as they are brought around into contact with it. However, it will be apparent that two or more of these rollers may be utilized, the centers of the rollers being disposed concentrically around the axis of axle 13. Also, means other than a roller or rollers may be employed to effect cocking and releasing of the spring elements. For example, a concentrically disposed hood can be utilized, the hood extending around the upper portion of the cylinder and terminating at a point adjacent the lower side of the roller 25.

Figure 4:
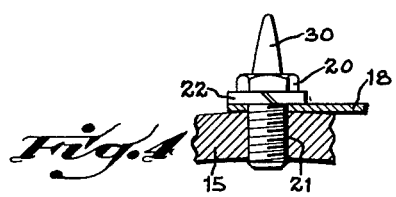
Figure 4 shows a modified form of the fastening means shown in Figure 3.

When heavy or strong strips are employed, it may be found expedient to utilize radial spurs such as the one shown in Figure 4. In this instance, the bolts 20 include tapered spurs 30 affixed to, or made integrally with, the heads of the bolts. The spurs 30 should be of such a length that they clear the roller 25.

Figure 5 shows an embodiment of the invention in which a gang of clod breaking implements is mounted in V formation in a rectangular frame 31 which is adapted to be drawn by a tractor. The representation in Figure 5 is diagrammatic, and only a few of the spring metal strips are shown on each of the cylindrical members. This particular embodiment is not shown in detail because it is believed that those skilled in the art will readily comprehend that the clod breaking implements can be assembled in gangs of greater number than those shown in Figure 5 and that different formations may be utilized.

Figure 6 of the drawings discloses a modified means for securing the spring metal strips to the cylindrical member. In this instance, a plate 32 is utilized for clamping the one end of the flexible metal strip to the surface of the cylinder. In this particular method of fastening, the strip members are not pierced for bolt holes as in the method shown in Figures 1 through 3. A pair of bolts 33—33 extend through holes in a pair of ears 34—34 on the clamp plate, straddling the strip. The inner face of the plate 32 is recessed as at 35 to embrace the end of the strip. The strip is held against lateral shifting in the recess by a lip 37 which is turned up at the inner end of the strip and engaged in a lateral groove 36 cut into the underside of plate 32. This particular fastening makes it easy to remove the strips in case replacement or change is required.

Figure 8 discloses an auxiliary wheel member, indicated generally at 40, which may be utilized in connection with the tractor drawn model of the implement disclosed in Figure 5, or used in conjunction with the heavier hand drawn models, in order to elevate the implement so as to raise the spring strips off the ground when the implement is being moved over hard surfaces or when it is necessary to back up the implement. The assembly 40 includes a wheel 41 which is journalled in a fork on one arm of a bellcrank lever 42, the other arm constituting a handle 43. The lever 42 is pivotally mounted on the side of the frame as at 44 and a spring urged detent pin 45 is provided for cooperation with annularly disposed holes 46 located in the side of the frame, so that the wheel may be locked in different positions relative to the frame. When the implement is being used for earth working, the wheel 41 is raised to the position shown in dot-dash lines in Figure 8. Wheels similar to the one shown may be provided in pairs or in sets of three or more, depending upon the size and weight of the implement.

The various modifications of the invention shown in the drawings are only suggestive of a number which may be made utilizing the principle of operation disclosed here. For example, the implements may be mounted in individual frames which may be attached together in order to provide gang operation. For another thing, the cylindrical member may be pierced in order to decrease its weight. Also, it is possible by changing the lengths of the spring elements to place the strips in any one circumferential row in overlapping relationship, leaving off the weights, so that the end portions only of the strips hit the ground, this particular portion of the strip being the most effective. It is also possible to vary the width of the spring strips making them either wider or narrower depending upon the uses to which the particular implement is to be employed. It will be understood that the term "cylindrical member" is used in the description of the drawings and the appended claims in a generic sense. The cylindrical member may be fabricated by joining cylindrical segments end to end or made polygonal in cross section without departing from the spirit of the invention.

Having described my invention, I claim:

1. An earth working implement comprising, a cylindrical member adapted to be rolled over the ground, a spring metal strip carried by the cylindrical member, said strip having one end affixed to the cylindrical member with the major portion of the strip extending substantially tangentially therefrom in the direction opposite the rotative motion of the cylindrical member when it is being rolled, and means effective when the cylinder is being rolled for flexing said strip toward the cylindrical member as the affixed end of said strip approaches the ground, said means releasing the strip after said affixed end contacts the ground.

2. An earth working implement comprising, a cylindrical member adapted to be rolled over the ground, a spring metal strip having one end affixed to the cylindrical member and extending substantially tangentially therefrom in a direction opposite the rotative motion of the member when it is being rolled, and a roller adapted to engage the outer face of the strip and flex the strip inwardly toward the cylindrical member as the strip passes said roller, said roller being positioned to effect release of the strip after the affixed end of said strip contacts the ground.

3. An earth working implement comprising, a cylindrical member adapted to be rolled over the ground, a plurality of spring metal strips carried by the cylinder, each strip having an end affixed to the cylinder leaving the major portion of the strip extending tangentially from the surface of the cylinder, and means effective when the member is being rolled for flexing the strip inwardly toward the cylindrical member as the affixed end of the strip approaches the ground, said means releasing the strip after said affixed end contacts the ground.

4. An earth working implement comprising, a cylindrical member adapted to be rolled over the ground, a plurality of flexible strips extending tangentially from the cylindrical member, and a roller disposed parallel with the cylindrical member adapted to bend and then release the strips as the member is being rolled over the ground whereby the strips upon release slap the ground in front of the cylindrical member.

5. An earth working implement comprising, a cylindrical member adapted to be rolled over the ground, a plurality of flexible strips carried by said member, each strip having one end affixed to the member and having a free end extending tangentially therefrom, and a roller disposed parallel with the cylindrical member and closer thereto than the free ends of the tangentially extended strips, whereby the strips engage the roller when the member is rolled over the ground and bend toward the cylindrical member upon contact therewith, said roller being disposed so as to effect release of the free ends of the strips after the affixed ends thereof contact the ground.

6. An earth working implement comprising, a cylindrical member adapted to be rolled over the ground, a plurality of flexible strips extending tangentially from the cylindrical member, and strip cocking and releasing means operable when the cylindrical member is rolled forward over the ground, said means effecting release of the strips in front of the cylindrical member so that they slap the ground ahead of it.

RUTHERFORD R. QUILLEN.

REFERENCES CITED

The following references are of record in the file of this patent:

UNITED STATES PATENTS

| Number | Name | Date |
|---|---|---|
| 835,929 | Bassett | Nov. 13, 1906 |
| 874,286 | Bassett | Dec. 17, 1907 |
| 1,204,741 | Bunker | Nov. 14, 1916 |
| 1,458,655 | Jahn | June 12, 1923 |
| 1,505,572 | McDonald | Aug. 19, 1924 |
| 1,542,963 | Russell | June 23, 1925 |
| 1,780,587 | Gustafson | Nov. 4, 1930 |

FOREIGN PATENTS

| Number | Country | Date |
|---|---|---|
| 596,405 | France | Oct. 23, 1925 |